US011530052B1

(12) United States Patent
Alspaugh et al.

(10) Patent No.: US 11,530,052 B1
(45) Date of Patent: Dec. 20, 2022

(54) SYSTEMS AND METHODS FOR AUTOMATED GROUND HANDLING OF AERIAL VEHICLES

(71) Applicant: Amazon Technologies, Inc., Seattle, WA (US)

(72) Inventors: David L. Alspaugh, Seattle, WA (US); Pragyana K. Mishra, Seattle, WA (US); Dipan M. Shah, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 356 days.

(21) Appl. No.: 16/792,874

(22) Filed: Feb. 17, 2020

(51) Int. Cl.
    *B64F 1/22*    (2006.01)
    *B64C 39/02*   (2006.01)
    *B64F 5/40*    (2017.01)
    *B64F 5/60*    (2017.01)

(52) U.S. Cl.
    CPC ............ *B64F 1/228* (2013.01); *B64C 39/024* (2013.01); *B64F 5/40* (2017.01); *B64F 5/60* (2017.01); *B64C 2201/128* (2013.01); *B64C 2201/141* (2013.01); *B64C 2201/20* (2013.01)

(58) Field of Classification Search
    CPC .... B64F 1/228; B64F 5/40; B64F 5/60; B64C 39/024; B64C 2201/128; B64C 2201/141; B64C 2201/20
    See application file for complete search history.

(56) References Cited

U.S. PATENT DOCUMENTS

| 5,454,533 | A | 10/1995 | Grant et al. |
| 6,374,982 | B1 | 4/2002 | Cohen et al. |
| 7,373,844 | B1 | 5/2008 | Chen et al. |
| 9,108,805 | B2 * | 8/2015 | Thomas ................ B65G 43/08 |
| 9,452,528 | B1 | 9/2016 | Checka et al. |
| 9,687,982 | B1 | 6/2017 | Jules et al. |
| 9,718,195 | B1 | 8/2017 | Youmans |
| 10,166,676 | B1 | 1/2019 | Hudson et al. |

(Continued)

FOREIGN PATENT DOCUMENTS

| DE | 102020125583 A1 | 3/2022 |
| WO | 2020041819 A1 | 3/2020 |

OTHER PUBLICATIONS

Paletta, L., Fritz, G., Kintzler, F., Irran, J., and Dorffner, G. (2007). "Perception and Developmental Learning of Affordances in Autonomous Robots," In Annual Conference on Artificial Intelligence (Cambridge: Springer), 235-250. doi: 10.1007/978-3-540-74565 -5_ 19 (Year: 2007).

(Continued)

*Primary Examiner* — Yuen Wong
(74) *Attorney, Agent, or Firm* — Athorus, PLLC

(57) ABSTRACT

Systems and methods relating to automated handline of aerial vehicles are disclosed. The described systems and methods can include a plurality of robots operating on a continuous, closed-loop track. A plurality of aerial vehicle handling stations can be disposed along the continuous, closed-loop track, and each of the plurality of robots can engage an aerial vehicles and transport it to the aerial vehicle handling station, as needed, in accordance with a workflow associated with the aerial vehicle. The described systems and methods can provide a fully automated system for the ground handling of multiple aerial vehicles simultaneously.

12 Claims, 12 Drawing Sheets

(56) References Cited

U.S. PATENT DOCUMENTS

| | | |
|---|---|---|
| 10,279,480 B1 | 5/2019 | Holson et al. |
| 10,406,685 B1 | 9/2019 | Wilson |
| 11,014,234 B2 | 5/2021 | Toshimitsu |
| 11,091,256 B2 | 8/2021 | Cappelleri et al. |
| 11,154,985 B1 | 10/2021 | Strauss |
| 11,235,890 B1 | 2/2022 | Dahlstrom et al. |
| 2006/0249623 A1 | 11/2006 | Steele |
| 2007/0032923 A1 | 2/2007 | Mossman et al. |
| 2009/0108605 A1 | 4/2009 | Becker et al. |
| 2009/0294584 A1 | 12/2009 | Lovell et al. |
| 2010/0280661 A1 | 11/2010 | Abdallah et al. |
| 2013/0082137 A1 | 4/2013 | Gundlach et al. |
| 2016/0144510 A1 | 5/2016 | Gulhar et al. |
| 2017/0057081 A1 | 3/2017 | Krohne et al. |
| 2017/0277167 A1 | 9/2017 | Noda et al. |
| 2018/0071874 A1 | 3/2018 | Bergeron et al. |
| 2018/0217249 A1 | 8/2018 | Salla et al. |
| 2018/0265295 A1 | 9/2018 | Beckman et al. |
| 2018/0265296 A1 | 9/2018 | Beckman et al. |
| 2018/0345487 A1 | 12/2018 | Sandhu et al. |
| 2019/0283251 A1 | 9/2019 | Nakamoto |
| 2019/0321971 A1 | 10/2019 | Bosworth et al. |
| 2019/0322384 A1 | 10/2019 | Bosworth |
| 2020/0016756 A1 | 1/2020 | Rus et al. |
| 2020/0024853 A1 | 1/2020 | Furrer et al. |
| 2020/0027326 A1 | 1/2020 | Ravat |
| 2020/0055195 A1 | 2/2020 | Ignakov |
| 2020/0070354 A1 | 3/2020 | Nakayama et al. |
| 2020/0361634 A1 | 11/2020 | Gil |
| 2021/0023711 A1 | 1/2021 | Lee et al. |
| 2021/0122039 A1 | 4/2021 | Su et al. |
| 2021/0122056 A1 | 4/2021 | Menon et al. |
| 2021/0269149 A1 | 9/2021 | Culver |
| 2021/0323171 A1 | 10/2021 | Pivac et al. |
| 2021/0362334 A1 | 11/2021 | Yamane |
| 2021/0387336 A1 | 12/2021 | Fukusen |
| 2022/0226995 A1 | 7/2022 | Beck et al. |

OTHER PUBLICATIONS

Viña, F. E., Bekiroglu, Y., Smith, C Karayiannidis, Y., Kragic, D. (2013). Predicting Slippage and Learning Manipulation Affordances Through Gaussian Process Regression. In 2013 13th IEEE-RAS International Conference on Humanoid Robots (Humanoids) (pp. 462-468). (Year. 2013).

* cited by examiner

SYSTEMS AND METHODS FOR AUTOMATED GROUND HANDLING OF AERIAL VEHICLES

BACKGROUND

Aerial vehicles typically require handling that is meticulous and precise. However, manual handling of aerial vehicles can be difficult, time consuming, and can often lead to damage of the aerial vehicle. For example, various components such as pitot tubes and wings can be damaged, calibrated sensors can be inadvertently moved thereby requiring recalibration, connectors can become dislodged, etc. Further, the aerial vehicles can be unknowingly subjected to forces and torques that may compromise the structural integrity of the aerial vehicle.

DETAILED DESCRIPTION

Figure 1A:
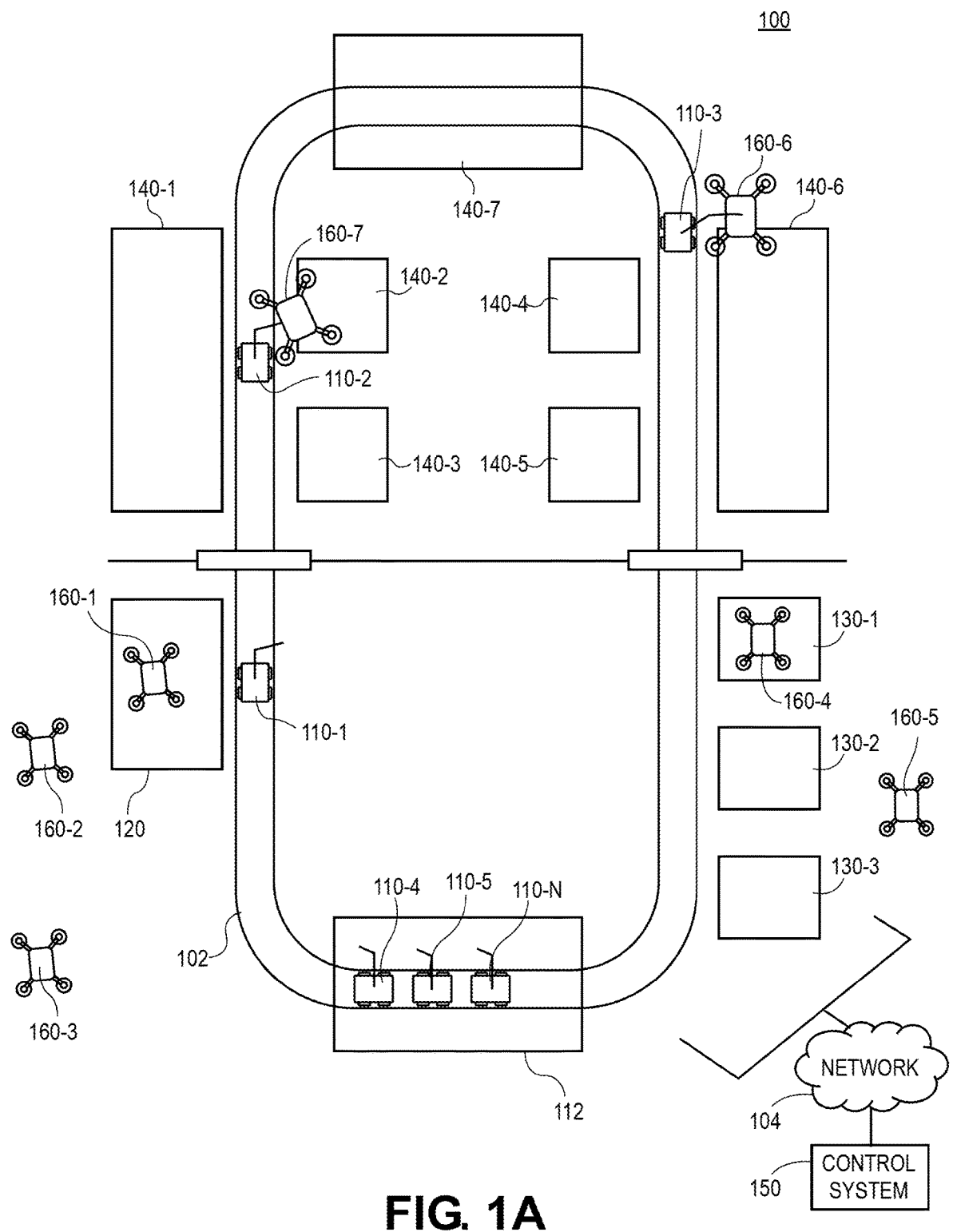
FIGS. 1A, 1B, and 1C are block diagrams of an exemplary automated aerial vehicle ground handling system, in accordance with embodiments of the present disclosure.

As is set forth in greater detail below, embodiments of the present disclosure are generally directed to systems and methods for the automated ground handling of aerial vehicles such as unmanned aerial vehicles (UAV). Embodiments of the present disclosure can provide a plurality of robots operating on a continuous track (e.g., a robotic rail) to facilitate automated ground handling of aerial vehicles. The continuous track can form a closed loop, and various aerial vehicle handling stations can be disposed along the continuous track. Upon landing of an aerial vehicle, a robot can be dispatched to engage the aerial vehicle and can transport the aerial vehicle between the various aerial vehicle handling stations via the continuous track. Accordingly, a portion of the continuous track can be located outdoors to access landing and takeoff areas and a portion of the continuous track can be located indoors, where certain aerial vehicle handling stations may be located. Further, a control system can control the navigation and routing of the plurality of robots to effectively manage the handling of multiple aerial vehicles via the continuous track.

As described herein, the automated aerial vehicle handling system can include a plurality of robots operating on a continuous closed loop track that can transport an aerial vehicle between a plurality of aerial vehicle handling stations disposed along the continuous closed loop track. The robots can include a carriage portion configured to engage the continuous closed loop track and a robotic arm having multiple degrees of freedom (e.g., 6 degrees of freedom—translation along the X-axis, Y-axis, and Z-axis and rotation about the X-axis, Y-axis, and Z-axis) configured to engage, manipulate, and orient the aerial vehicles in various poses. Given the precision and accuracy provided by the robotic arm, the continuous track provided by embodiments of the present disclosure do not require the precision and accuracy traditionally required in robotic track systems, which are typically limited to linear, high-precision lengths of track. Accordingly, the continuous closed loop track according to embodiments of the present disclosure can incorporate turns, curves, changes in elevation, etc. This can provide a closed loop track. The closed loop design can allow robots to navigate the continuous track without having to backtrack along the track, which can facilitate the operation of multiple robots simultaneously for the ground handling of multiple aerial vehicles through the various aerial vehicle handling stations, in parallel. The various aerial vehicle handling stations can include, for example, a landing area, an inspection station, a payload station, a maintenance station, a power station, a storage area, a takeoff area, a robot queuing area, a ground station equipment area, etc.

For example, upon landing of an aerial vehicle, the vehicle type can be determined, and sensor information can be analyzed to determine a ground handling workflow for the aerial vehicle. The workflow can include a sequenced order of the various aerial vehicle handling stations to define how the ground handling process for the aerial vehicle is to proceed. The sequenced order of the aerial vehicle handling stations can be dictated by the design of the aerial vehicle, as well as sensor information provided by the aerial vehicle, to provide a logical workflow based on that design. For example, an aerial vehicle's design may require that its battery be removed before the payload can be accessed, while other aerial vehicles may require the payload to first be accessed before accessing the battery, etc. Accordingly, the workflow can vary depending on the vehicle type of the aerial vehicle and can dictate the order in which the handling stations are to be visited by the aerial vehicle. Additionally, certain sensor information can also be used to determine the ground handling workflow of the aerial vehicle. For example, if the aerial vehicle experienced a collision, the ground handling workflow may first require inspection of the aerial vehicle. Other sensor information, such as battery charge level, can also be utilized to determine, for example, whether the aerial vehicle should be recharged at a power station. Based on the workflow for the aerial vehicle, a robot can be dispatched to navigate, via the continuous track, to the landing area to engage the aerial vehicle and then transport the aerial vehicle, via the continuous track, to the next aerial vehicle handling station in accordance with the workflow associated with the aerial vehicle.

According to certain embodiments of the present disclosure, the continuous track and the aerial vehicle handling stations can be designed in a modular fashion such that the track and the location of stations along the track can be moved and/or removed to accommodate changing needs/requirements, different vehicle types, the workflow of certain aerial vehicles, changing workflows for vehicles, etc. For example, the continuous track can be lengthened, changed in shape, etc. and the position and location of the ground handling stations can be changed, added, removed, etc. along the continuous track. While the robot is performing the ground handling of the aerial vehicle, a second aerial vehicle may land and a second robot may be dispatched to perform ground handling of the second aerial vehicle, in a similar fashion. Accordingly, embodiments of the present disclosure can facilitate the automated ground handling of multiple aerial vehicles, in parallel. According to certain aspects of the present disclosure, multiple types of robots can operate on the continuous track simultaneously to facilitate ground handling of multiple vehicle types and/or different ground handling workflows at the same time.

According to certain embodiments of the present disclosure, the continuous track can also include a switching network that can control access to bypass track segments and pull-off zones. Bypass track segments can expedite ground handling of aerial vehicles by allowing robots to take a more efficient routing and skip certain aerial vehicle handling stations that are not required in the workflow of the aerial vehicle. This can be determined, for example, based on sensor information and/or workflows for specific vehicle types (e.g., different vehicle types may require different ground handling workflows). Pull-off zones can be utilized to prevent a problematic robot from shutting down the system. For example, an inoperable robot can cause congestion by preventing robots behind the robot to progress. Accordingly, the inoperable robot can be navigated to a pull-off zone so that the robots behind the problematic robot can proceed. Pull-off zones can also be utilized when different vehicle types with different workflows are being processed and may require certain vehicles types to pass other vehicle types at certain ground handling stations.

Preferably, a single robot can engage an aerial vehicle upon landing and perform the entire ground handling workflow from landing through to takeoff or storage so that there would be no handoff of the aerial vehicle between different automated systems. This can reduce the time and complexity of ground handling, as well as reduce the risk of damages to the aerial vehicle.

Another embodiment of the present disclosure can provide a method for upgrading an existing facility with a system for automated handling of aerial vehicles. For example, an existing facility can be retrofitted to include a continuous track on which a plurality of robots can operate to facilitate ground handling of the aerial vehicle between various aerial vehicle handling stations. According to certain embodiments, the continuous track can be routed through existing doors of the facility, and the track can be customized (e.g., lengthened, reshaped, etc.) to accommodate the design of the facility.

Another embodiment of the present disclosure can provide a plurality of closed loop continuous tracks. In this embodiment, each closed loop continuous track can be designed to process a respective phase in the ground handling process of the vehicles being processed. Accordingly, robots can operate on each of the closed loop continuous tracks and facilitate ground handling for each respective phase of the ground handling process of vehicles on each respective closed loop continuous track. Once the respective ground handling phase has been completed, the robot can transfer/hand-off the vehicle to a robot operating on the next closed loop continuous track so that the next phase in the ground handling process can be performed. This transfer/hand-off can be repeated until the entire ground handling process is completed.

Although embodiments of the present disclosure are described primarily with respect to aerial vehicles, embodiments of the present disclosure can be applicable to any other types of vehicles that can benefit from automated handling thereof, such as, for example, unmanned aerial vehicles, ground based vehicles, autonomous ground based vehicles, water based vehicles, unmanned water based vehicles, etc.

Figure 1B:
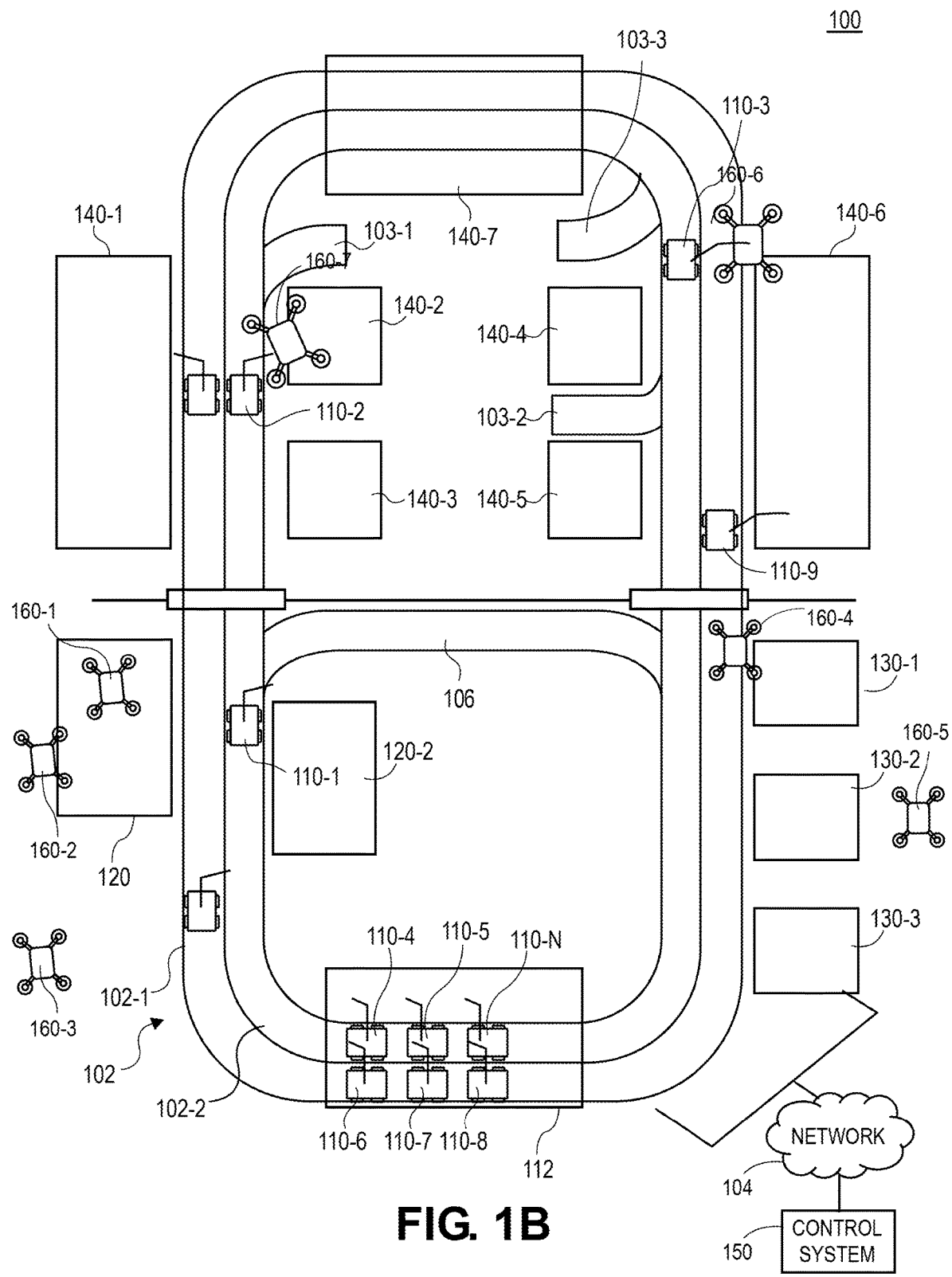
Figure 1C:
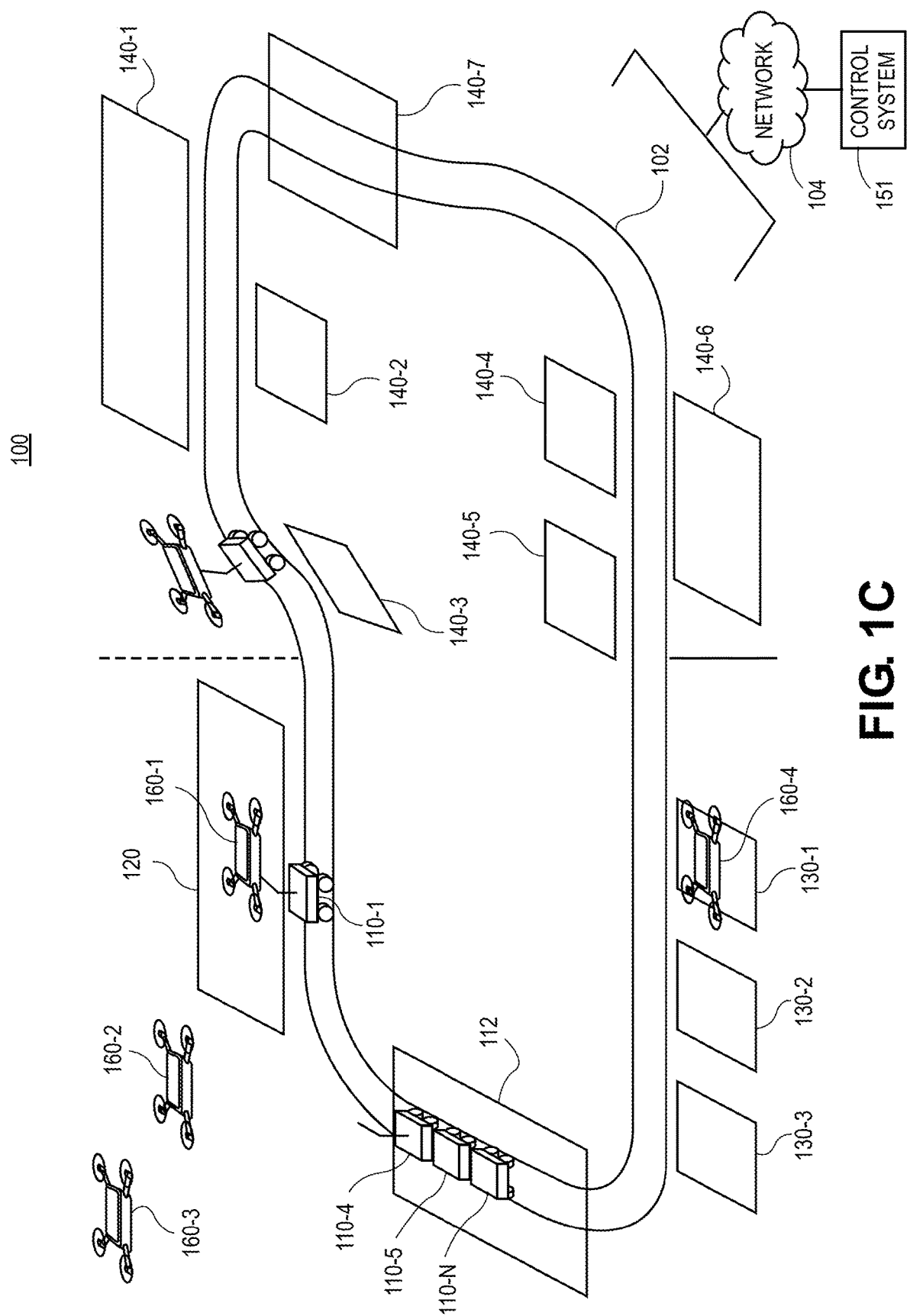

FIGS. 1A, 1B, and 1C are block diagrams of an exemplary automated aerial vehicle ground handling system 100 in accordance with embodiments of the present disclosure. For example, automated aerial vehicle ground handling system 100 can provide ground handling of aerial vehicles 160 at any facility. For example, the facility can include an airport, a hangar, a maintenance facility, etc. Preferably, automated aerial vehicle ground handling system 100 can provide ground handling at a fulfillment center type facility where aerial vehicles 160 may be used for delivery of a payload (e.g., package, etc.). As shown in FIGS. 1A, 1B, and 1C, aerial vehicle 160-1 may have landed, aerial vehicles 160-2 and 160-3 may be performing approaches for landing, aerial vehicles 160-6 and 160-7 may be undergoing the ground handling process, aerial vehicle 160-4 may have completed the ground handling process and is preparing for takeoff, and aerial vehicle 160-5 may have completed the ground handling process and has taken off.

As shown in FIGS. 1A, 1B, and 1C, automated aerial vehicle ground handling system 100 can include continuous track 102, robots 110, robot queuing area 112, landing area 120, takeoff areas 130, aerial vehicle handling stations 140, and control system 150. FIGS. 1A, 1B, and 1C also show aerial vehicles 160 that are being processed by automated aerial vehicle ground handling system 100. As shown in FIGS. 1A, 1B, and 1C, aerial vehicle handling stations 140 can be disposed along continuous track 102 such that robots 110 can transport aerial vehicles 160 to one or more of aerial vehicle handling stations 140 for ground handling. According to certain embodiments, aerial vehicle handling stations 140 can be disposed on both sides of continuous track 102 to increase parallel handling of aerial vehicles 160, thereby resulting in higher throughput. Robots 110 and aerial vehicles 160 may be in communication with control system 150 through network 104. Although automated aerial vehicle ground handling system 100 is shown having an oval-shaped continuous track 102 with a certain number of robots 110 and aerial vehicle handling stations 140, continuous track 102 can be of any shape, and automated aerial vehicle ground handling system 100 can include any number and type of robots 110 and aerial vehicle handling stations 140. For example, continuous track 102 can have different elevations (e.g., FIG. 1C shows continuous track 102 having different elevations), shapes, curves, etc. to facilitate operation and navigation of robots 110 on continuous track 102 between landing area 120, takeoff areas 130, and aerial vehicle handling stations 140. Additionally, numerous types of robots 110 can operate on automated aerial vehicle ground handling system 100 simultaneously, e.g., to handle ground handling of different vehicle types, etc. Further, automated aerial vehicle ground handling system 100 can be designed in a modular fashion such that automated aerial vehicle ground handling system 100 can be easily modified (e.g., the design, length, etc. of continuous track 102 can be changed and/or the number, placement, etc. of aerial vehicle handling stations 140 can be changed) to accommodate any changing needs, different vehicle types, and/or requirements of the ground handling facility. As shown in FIGS. 1A, 1B, and 1C, a portion of continuous track 102 can be disposed in an outdoor environment such that landing areas 120 and takeoff areas 130 are located adjacent to a portion of continuous track 102, and another portion of continuous track 102 can be disposed in an indoor environment (e.g., hangar, fulfillment center, etc.) where aerial vehicle handling stations 140 are located to perform certain ground handling operations.

In operation, as aerial vehicle 160-1 is making an approach to land (or after it has landed), automated aerial vehicle ground handling system 100 can determine that aerial vehicle 160-1 is performing a landing and robot 110-1 can be dispatched (e.g., from robot queuing area 112) to landing area 120 to engage aerial vehicle 160-1. Alternatively, robot 110-1 can be dispatched to engage another aerial vehicle 160 at any one of aerial vehicle handling stations 140. Once aerial vehicle 160-1 is identified, a vehicle type of aerial vehicle 160-1 can be determined and certain sensor information can be received from aerial vehicle 160-1. This allows a ground handling workflow associated with aerial vehicle 160-1 to be determined. The workflow can include a sequential order indicating how ground handling of aerial vehicle 160-1 is to be performed. For example, the design of a vehicle type may dictate that certain actions are to be performed before other operations can be performed. For example, some aerial vehicles may require that the battery be removed for an operator to be able to access the payload area or perform certain maintenance. Alternatively, for other aerial vehicles, it may be preferable to first perform certain maintenance prior to removing the battery, etc. Additionally, certain sensor information can also be used to determine the ground handling workflow of aerial vehicle 160-1. The sensor information can include sensor information provided from sensors on aerial vehicle 160-1, as well as sensor information from sensors included in automated aerial vehicle ground handling system 100. For example, if aerial vehicle 160-1 experienced a collision, sensor information indicating the collision can be provided to automated aerial vehicle ground handling system 100, and the ground handling workflow may first require inspection of aerial vehicle 160-1. Other sensor information, such as battery charge level, can also be utilized to determine, for example, whether aerial vehicle 160-1 should be recharged at a power station, etc. According to certain aspects, automated aerial vehicle ground handling system 100 can also include sensors, such as imaging sensors (e.g., thermal, optical, etc.), and sensor information from these sensors can be also utilized to facilitate ground handling of aerial vehicle 160-1. For example, the imaging sensors can detect a thermal runaway and/or a fire condition on aerial vehicle 160-1 and robot 110 (which can optionally be equipped with fire-fighting capabilities) can be dispatched to attend to the fire situation associated with incoming aerial vehicle 160-1. The workflow can therefore specify which aerial vehicle handling stations 140 are to be visited and the order in which aerial vehicle handling stations 140 are to be visited.

After robot 110-1 has engaged aerial vehicle 160-1 and the workflow associated with aerial vehicle 160-1 has been determined, robot 110-1 can transport aerial vehicle 160-1 to the various aerial vehicle handling stations 140 in accordance with the workflow. According to certain exemplary embodiments, aerial vehicle handling stations 140 can include, for example, landing area 120, inspection station 140-1, payload station 140-5, maintenance station 140-7, power station 140-4, storage area 140-6, takeoff area 130, robot queuing area 112, ground station equipment area 140-3, etc. Other areas can also be included along continuous track 102, such as a robot maintenance area, etc. For example, after robot 110-1 engages aerial vehicle 160-1 at landing area 120, robot 110-1 can transport aerial vehicle 160-1 to inspection station 140-1. Next, robot 110-1 may transport aerial vehicle 160-1 to maintenance station 140-7, power station 140-4, and/or payload station 140-5. If aerial vehicle 160-1 is to perform another mission after ground handling is complete, robot 110-1 may transport aerial vehicle 160-1 to takeoff area 130. Alternatively, robot 110-1 may transport aerial vehicle 160-1 to storage area 140-6. According to certain aspects, aerial vehicles 160 can be stored on continuous track 102. Preferably, robot 110-1 is engaged with aerial vehicle 160-1 throughout the entire ground handling procedure of aerial vehicle 160-1 and does not transfer aerial vehicle 160-1 to another robot 110. This can reduce the complications and risks associated with handoffs between various systems and mitigate the risk of damaging aerial vehicle 160-1.

Additionally, robot 110-1 can continuously track and log the progress of aerial vehicle 160-1 through the ground handling process. For example, robot 110-1 can store the type of inspection performed, results of the inspection, any maintenance performed, whether aerial vehicle 160-1 had performed a successful delivery, battery charge condition, etc. This information can optionally be provided to control system 150 as feedback so that control system 150 can keep track of aerial vehicles 160 being processed by automated aerial vehicle ground handling system 100. Additionally, this information can be logged such that if the ground handling process is interrupted, aerial vehicle 160 is placed into storage, aerial vehicle 160 is sent on another mission prior to completing all tasks, etc., a record of the ground handling performed and additional ground handling to be performed can be efficiently ascertained, and ground handling of aerial vehicle 160 can resume. Alternatively, this information can be utilized to adjust workflows and the operation of automated aerial vehicle ground handling system 100 to further increase throughput and more efficient ground handling of aerial vehicles 160. For example, if certain aerial vehicle handling stations 140 are taking significantly more or less time to process aerial vehicles, the workflow can be adjusted for the unexpected durations at the identified aerial vehicle handling station 140.

According to certain embodiments of the present disclosure, aerial vehicle handling stations 140 of automated aerial vehicle ground handling system 100 may be arranged in view of the workflow of a certain vehicle type that is primarily serviced by automated aerial vehicle ground handling system 100. For example, aerial vehicle handling stations 140 can be laid out in a logical sequential flow according to the workflow associated with the vehicle type that is primarily being serviced. Alternatively, aerial vehicle handling stations 140 can be implemented in a modular fashion, such that the placement and location of aerial vehicle handling stations 140 can be changed to different locations and/or positions along continuous track 102. Additionally, this can allow certain aerial vehicle handling stations 140 to be removed and/or added as the needs and/or requirements of automated aerial vehicle ground handling system 100 change.

According to embodiments of the present disclosure, while robot 110-1 is engaged with aerial vehicle 160-1 and performing the ground handling operations associated with aerial vehicle 160-1, another aerial vehicle 160-2 may be performing an approach for landing. Similarly, another robot (e.g., 110-4) can be dispatched from robot queuing area 112 to landing area 120 to engage aerial vehicle 160-2 to perform ground handling operations associated with aerial vehicle 160-2, while aerial vehicle 160-1 is still undergoing ground handling operations.

As shown in FIG. 1B, automated aerial vehicle ground handling system 100 can optionally include continuous track 102 having two side-by-side parallel tracks 102-1 and 102-2, bypass track segments 106, and pull-off zones 103. In implementations where automated aerial vehicle ground handling system 100 may include parallel tracks 102-1 and 102-2, aerial vehicles being handled via track 102-1 can be serviced by aerial vehicle handling stations 140 disposed on one side of continuous track 102 and aerial vehicles being handled via track 102-2 can be serviced by aerial vehicle handling stations 140 disposed on the other side of continuous track 102. In such an arrangement, the layout of aerial vehicle handling stations 140 may be identical on both sides of continuous track 102. This can allow aerial vehicle ground handling system 100 to handle a greater number of aerial vehicles at a time, thereby providing a higher throughput for aerial vehicle ground handling system 100. Alternatively, a first type of aerial vehicles may be serviced via track 102-1 and a second type of aerial vehicles may be serviced via track 102-2. Accordingly, aerial vehicle handling stations 140 may be arranged adjacent to and along track 102-1 in a configuration specific to the first type of aerial vehicle and aerial vehicle handling stations 140 may be arranged adjacent to and along track 102-2 in a configuration specific to the second type of aerial vehicle.

Bypass track segments 106 and pull-off zones 103 can also provide for added efficiencies for aerial vehicle ground handling system 100. According to certain embodiments of the present disclosure, bypass track segments 106 can allow robots to reduce the distance traveled on continuous track 102 by traveling on bypass track segments 106 to bypass certain unnecessary portions of continuous track 102. If the workflow does not require aerial vehicle 160 to visit certain aerial vehicle handling stations 140, robot 110 can travel on bypass track segments 106 to reduce the distance traveled and take a more direct route to aerial vehicle handling stations 140 that are applicable in view of the workflow. For example, aerial vehicle 160 may not require its battery to be recharged after every mission. Accordingly, robot 110 that is engaged with aerial vehicle 160 may travel on bypass track segment 106 to avoid power station 140-4, thereby reducing the time to complete ground handling processing. Aerial vehicle ground handling system 100 can include any number of bypass track segment 106 at various locations to allow robots 110 to avoid certain aerial vehicle handling stations 140 during ground handling processing of aerial vehicles 160.

Pull-off zones 103 can provide areas for problematic robots 110 to be temporarily moved to ensure that the problematic robots do not create a logjam in aerial vehicle ground handling system 100. For example, if one of robots 110 were to become inoperable, it could create a congestion point, as other robots 110 operating behind the inoperable robot would no longer be able to progress along continuous track 102 to perform the ground handling processing for aerial vehicles 160. In such a circumstance, the inoperable robot can be navigated to a pull-off zone 103, thereby removing the inoperable robot from the ground handling path of continuous track 102 and allowing robots 110 behind the inoperable robot to pass. Access to bypass track segments 106 and pull-off zones 103 can be controlled via a switch network that can be controlled by control system 150. For example, the switch network can be similar to those typically employed in rail systems, roller coasters, etc.

Alternatively and/or in addition, pull-off zones 103 and/or bypass track segments 106 can be utilized to make ground handling of aerial vehicles more efficient. For example, based on feedback information provided by robots 110, workflows can be adjusted and/or modified. Accordingly, pull-off zones 103 and/or bypass track segments 106 can be utilized to implement the adjustments and/or modifications to the workflow of ground handling of aerial vehicles. Additionally, pull-off zones 103 and/or bypass track segments 106 can be utilized where multiple vehicle types are being serviced simultaneously at a common automated aerial vehicle ground handling system 100. For example, pull-off zones 103 and/or bypass track segments 106 can be used to accommodate different workflows of different vehicle types to allow robots to bypass certain aerial vehicle handling stations 140 and/or pass other robots that are performing the ground handling of another aerial vehicle.

Figure 2:
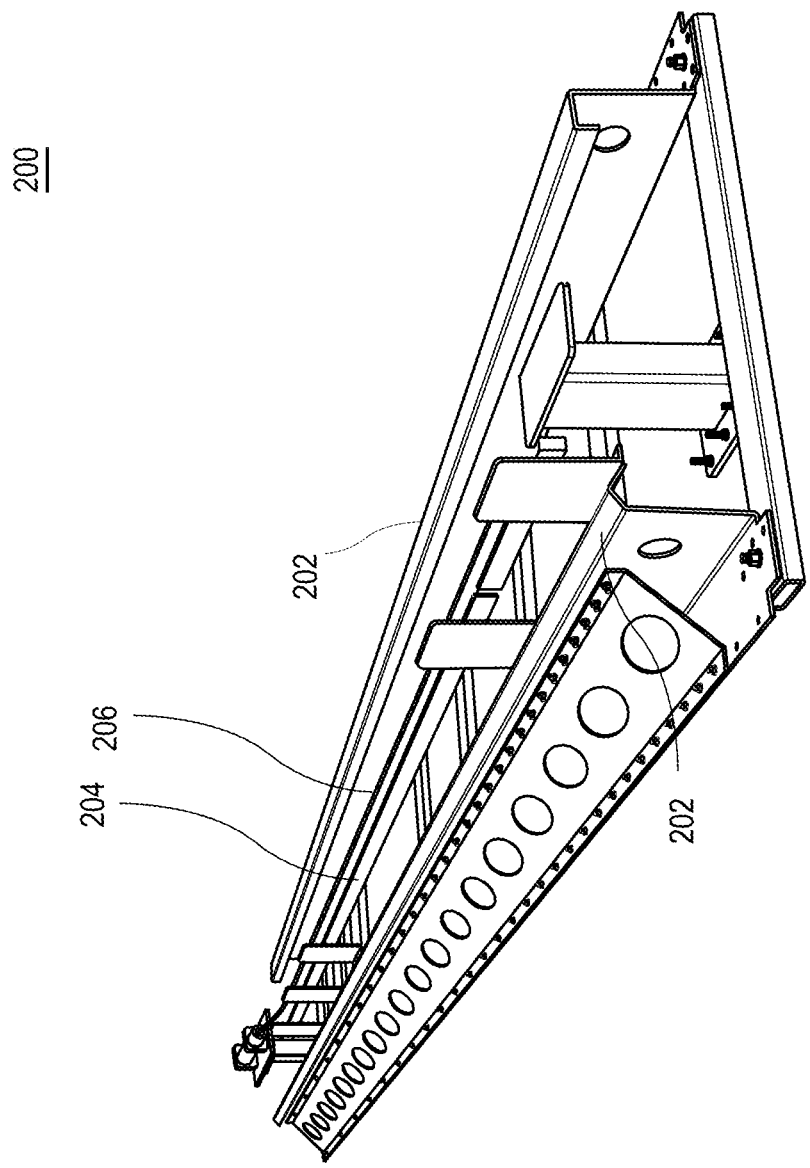
FIG. 2 is an illustration of an exemplary section of track, in accordance with embodiments of the present disclosure.

FIG. 2 shows an exemplary track section 200 of continuous track 102, in accordance with embodiments of the present disclosure. As shown in FIG. 2, continuous track 102 can include rails 202, power rail 204, and wireless transceiver 206. A plurality of track sections 200 can be joined to form continuous track 102. Although track section 200 is shown as a substantially linear section of track, track section 200 can include curves, turns, elevational changes, etc. such that continuous track 102 can form any three-dimensional shape. As can be seen in FIG. 2, rails 202 can engage components on robot 110 to facilitate operation of robot 110 on continuous track 102. Further, power rail 204 can mate with a connector coupled to robot 110 to provide power to robot 110. For example, power rail 204 can provide 110V, 208V, 240V, 480V, 600V, etc. service to robot 110. Wireless transceiver 206 can provide two-way communications between robots 110 and control system 150. For example, control system 150 can transmit information, such as instructions, commands, aerial vehicle type, the workflow associated with the aerial vehicle being handled, conditions that may exist (e.g., a congestion condition, etc.) on continuous track 102, aerial vehicle sensor information, etc. to robot 110 via wireless transceiver 206. Similarly, robot 110 can transmit information such as location, speed, pose of the aerial vehicle, sensor information, progress, any errors and/or faults, etc. to control system 150 via wireless transceiver 206.

Figure 3A:
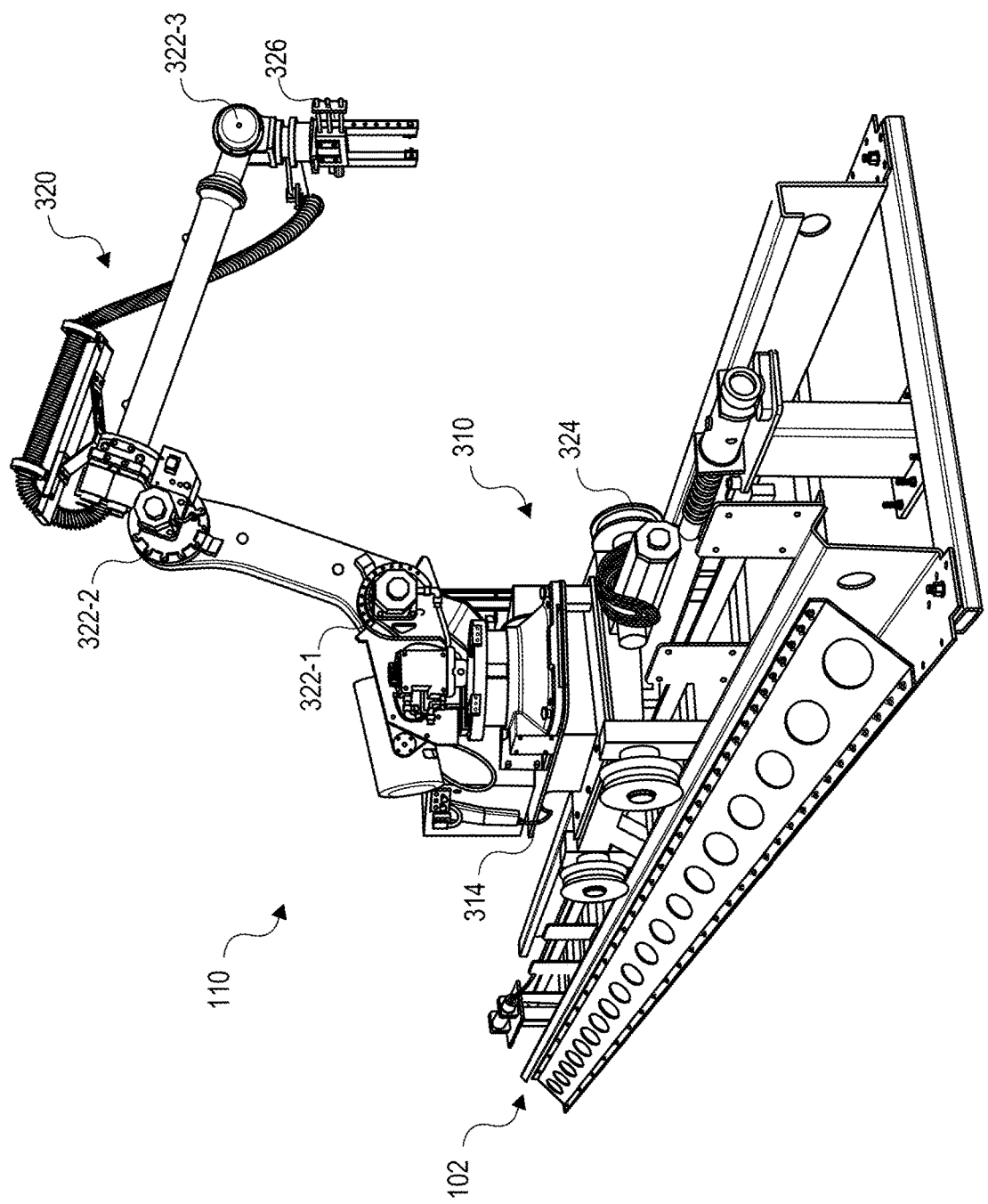
FIGS. 3A and 3B are illustrations of an exemplary robot, in accordance with embodiments of the present disclosure.
Figure 3B:
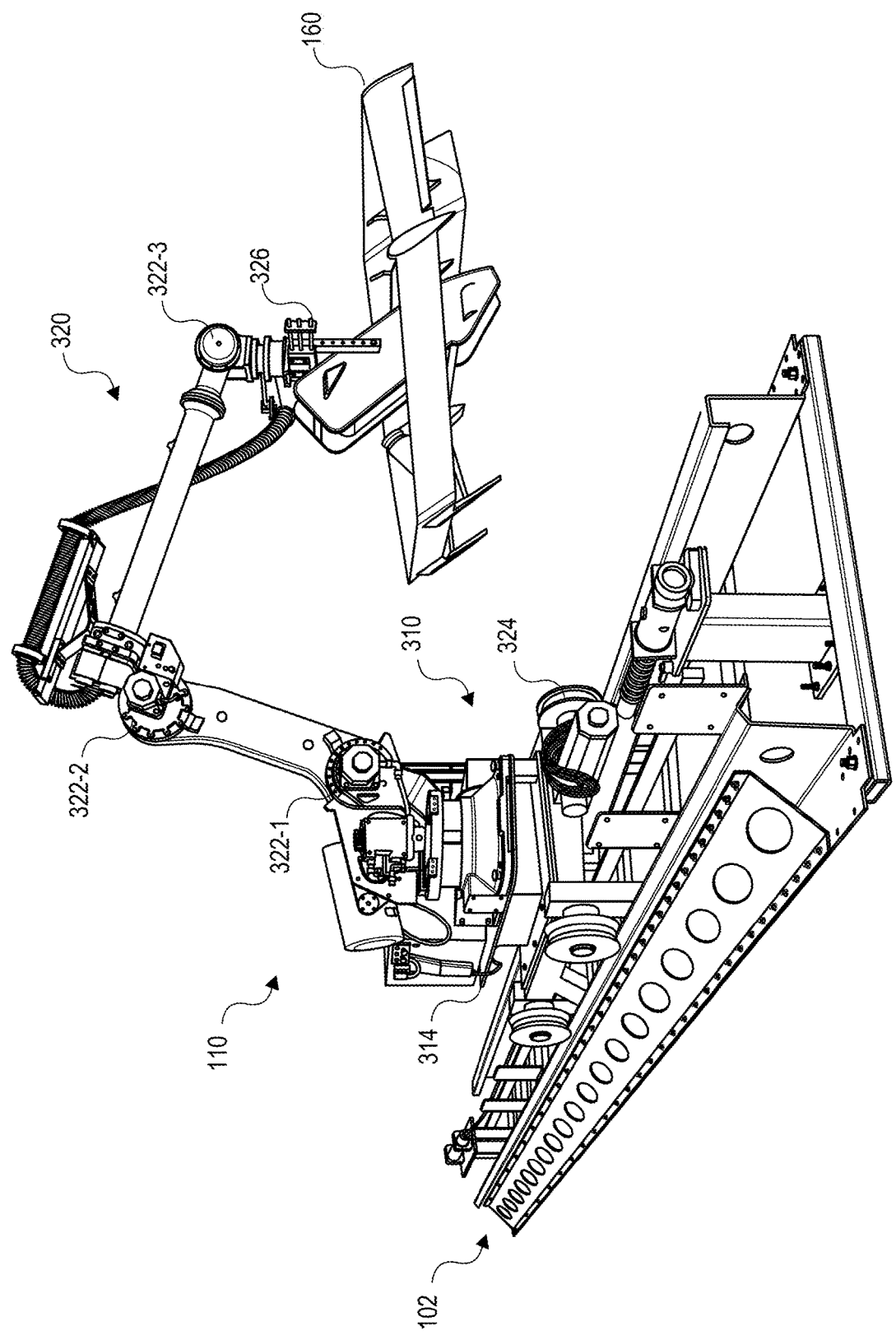

FIGS. 3A and 3B show an exemplary robot 110 on continuous track 102, in accordance with embodiments of the present disclosure. FIG. 3A shows robot 110 not engaged with an aerial vehicle while FIG. 3B shows robot 110 engaged with aerial vehicle 160. As shown in FIGS. 3A and 3B, robot 110 can include carriage portion 310 and robotic arm 320. Robotic arm 320 can engage an aerial vehicle for handling, and carriage portion 310 can be configured to engage and operate on continuous track 102, as well as support robotic arm 320. As shown in FIGS. 3A and 3B, carriage portion 310 can include base 314, wheels 324, a power connector, and a wireless transceiver. Base 312 can support robotic arm 320, while wheels 314 engage rails 202 of continuous track 102 and power connector 316 can mate with power rail 204 of continuous track 102. Wireless transceiver can provide a wireless connection with control system 150 (or other computing systems) to provide two-way communication with control system 150. For example, robot 110 can transmit information and data such as location, speed, pose of the aerial vehicle, sensor information, progress, any errors and/or faults, etc. to control system 150. Carriage portion 310 can also include a motor which can be configured to drive one or more wheels 314.

As shown in FIGS. 3A and 3B, robot 110 can also include robotic arm 320, which can engage aerial vehicle 160 and can include a plurality of articulating pivots 322 and grasping element 326. As shown in FIG. 3B, pivots 322 can provide six degrees of freedom of movement (e.g., translation along the X-axis, Y-axis, and Z-axis and rotation about the X-axis, Y-axis, and Z-axis) and grasping element 326 can engage aerial vehicle 160. Accordingly, the six degrees of freedom of movement that can be provided by robotic arm 320 can allow an engaged aerial vehicle to be manipulated and maneuvered such the aerial vehicle can be oriented in various different poses. According to one embodiment, robotic arm 320 can orient the aerial vehicle in a specific pose for each aerial vehicle handling station 140 for a given vehicle type. For example, robotic arm 320 may orient the aerial vehicle to allow easy access to the battery at power station 140-4. Alternatively and/or in addition, robotic arm 320 may orient the aerial vehicle to allow easy access to the payload at payload station 140-5, or robotic arm 320 may orient the aerial vehicle to provide easy access based on the type of maintenance that is being performed at maintenance station 140-7, etc. Further, the precision and accuracy of movement provided by robotic arm 320 can facilitate operation on a track or rail system, such as continuous track 102, that offers less precision than traditional robotic rail systems, which are typically limited to linear movement.

Robot 110 can also employ a multitude of various sensors to facilitate autonomous operation. For example, robot 110 can include imaging sensors (e.g., cameras), speed sensors, force and torque detectors, laser sensors (e.g., LIDAR), thermal sensors, radar, thermal sensors, accelerometers, gyroscopes, radio-frequency identification (RFID) sensors, etc. to facilitate autonomous operation along continuous track 102, as well as autonomy in engaging and disengaging aerial vehicles with grasping element 326. For example, aerial vehicles may land, or be oriented in various different poses at each given aerial vehicle handling station, and the multitude of sensors can facilitate detection of the pose of the aerial vehicle to allow robot arm 324 to safely and securely engage the aerial vehicle without damaging the aerial vehicle.

Optionally, robot 110 can also include other capabilities. For example, robot 110 can include tanks to store a firefighting foam (e.g., aqueous film-forming foam, etc.), along with a spray system, that can allow robot 110 to attend to firefighting situations. Other functionality (e.g., transport of materials, payloads, security, etc.) can also be provided on robot 110.

Robot 110 can also include a robot control system, as discussed in further detail below with respect to FIG. 8, which can control the operation, routing, navigation, communication, etc. of robot 110.

In operation, robot 110 can receive instructions and/or commands to navigate to landing area 120, via continuous track 102, to engage aerial vehicle 160. Robot 110 may also be provided with a vehicle type of aerial vehicle 160, certain sensor information received from aerial vehicle 160, and a workflow associated with the vehicle type. Based on the vehicle type and the workflow, robotic arm 320 can engage aerial vehicle 160, using grasping element 326, and robot 110 can transport aerial vehicle 160 to a next aerial vehicle handling station 140, as provided by the workflow. Upon arrival at aerial vehicle handling station 140, robotic arm 320 can orient aerial vehicle 160 in a pose defined by the ground handling being performed at aerial vehicle handling station 140. After all tasks have been completed at aerial vehicle handling station 140, robot 110 can navigate, via continuous track 102, to the next aerial vehicle handling station 140, as provided by the workflow. Once all ground handling processing for aerial vehicle 160 has been completed, robot 110 can transport aerial vehicle to storage or takeoff areas 130 and navigate back to robot queuing area 112. Further, as robot 110 is facilitating the ground handling of aerial vehicle 160, other robots 110 may be facilitating the ground handling of other aerial vehicles 160, in parallel.

Figure 4:
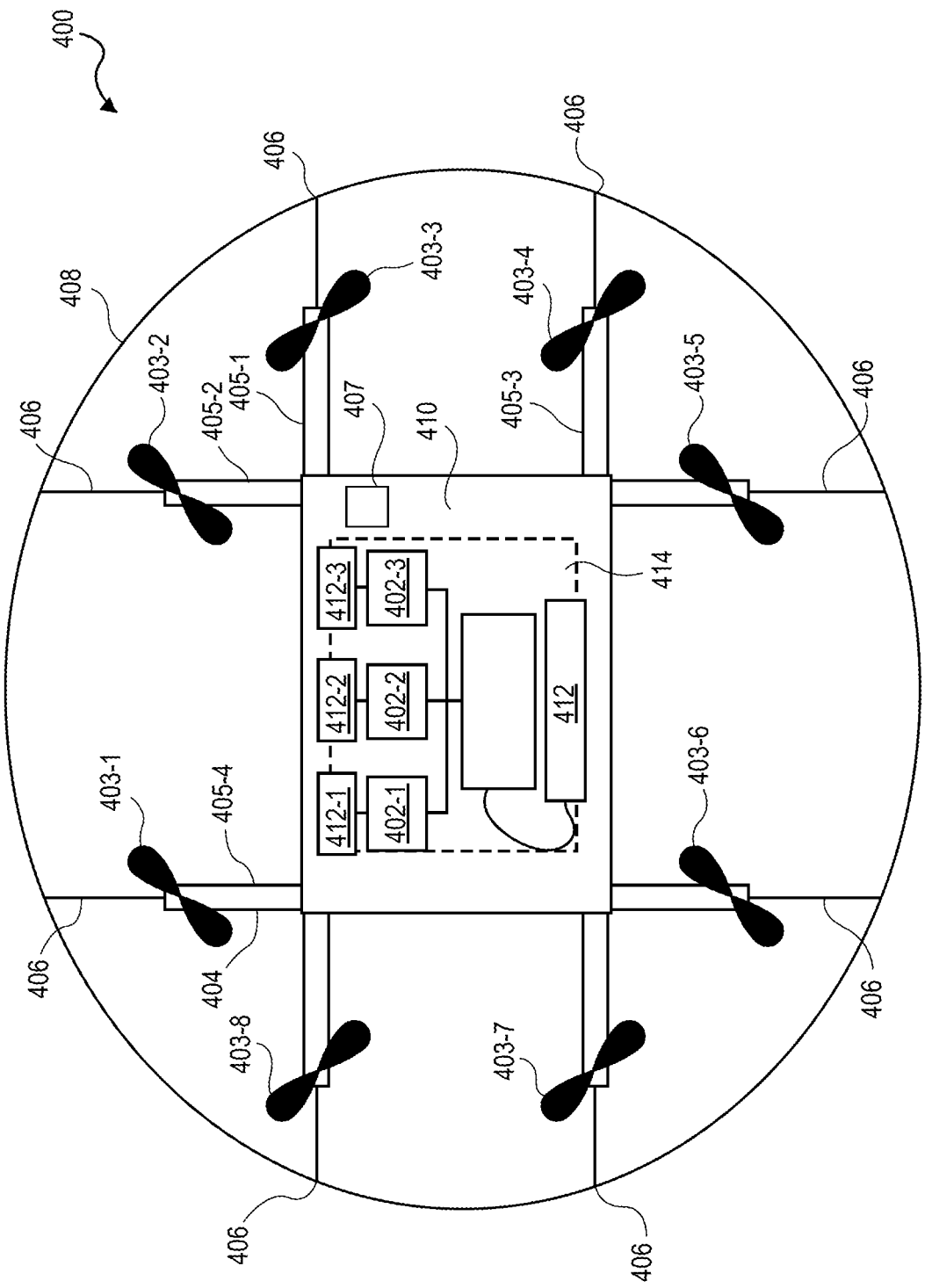
FIG. 4 is an illustration of an exemplary aerial vehicle, in accordance with embodiments of the present disclosure.

FIG. 4 is an illustration of an exemplary aerial vehicle 400 that may have ground handling processing performed by automated aerial vehicle ground handling system 100, in accordance with embodiments of the present disclosure. As illustrated, the aerial vehicle 400 can include eight propellers 403-1, 403-2, 403-3, 403-4, 403-5, 403-6, 403-7, 403-8 spaced about the frame 404 of the aerial vehicle. The propellers 403 may be any form of propeller (e.g., graphite, carbon fiber) and of a size sufficient to lift the aerial vehicle 400 and any inventory engaged by the aerial vehicle 400 so that the aerial vehicle 400 can navigate through the air to deliver the item(s) to a delivery location. While this example includes eight propellers, in other implementations, more or fewer propellers may be utilized. Likewise, in some implementations, the propellers may be positioned at different locations on the aerial vehicle 400. In addition, alternative methods of propulsion may be utilized as "motors" in implementations described herein. For example, fans, jets, turbojets, turbo fans, jet engines, internal combustion engines, and the like may be used (either with propellers or other devices) to propel the aerial vehicle.

The frame 404 of the aerial vehicle 400 may likewise be of any suitable material, such as graphite, carbon fiber and/or aluminum. In this example, the frame 404 of the aerial vehicle 400 includes four rigid members 405-1, 405-2, 405-3, 405-4, or beams arranged in a hash pattern with the rigid members intersecting and joined at approximately perpendicular angles. In this example, rigid members 405-1 and 405-3 are arranged substantially parallel to one another and are approximately the same length. Rigid members 405-2 and 405-4 are arranged substantially parallel to one another, yet perpendicular to rigid members 405-1 and 405-3. Rigid members 405-2 and 405-4 are approximately the same length. In some embodiments, all of the rigid members 405 may be of approximately the same length, while in other implementations, some or all of the rigid members may be of different lengths. Likewise, the spacing and/or orientation between the two sets of rigid members may be approximately the same or different. Frame 404 can also include grasping point 407, at which grasping element 326 of robot 110 can engage. For example, grasping point 407 can include a reinforced section that includes an element, such as a recess, a hole, an opening, etc. that can receive and/or mate with grasping element 326 of robot 110. Grasping point 407 can be reinforced and structured and designed to prevent damage to aerial vehicle 400 as aerial vehicle 400 is engaged, transported, and manipulated by robot 110.

While the implementation illustrated in FIG. 4 includes four rigid members 405 that are joined to form the frame 404, in other implementations, there may be fewer or more components to the frame 404. For example, rather than four rigid members, in other implementations, the frame 404 of the aerial vehicle 400 may be configured to include six rigid members. In such an example, two of the rigid members 405-2, 405-4 may be positioned parallel to one another. Rigid members 405-1, 405-3 and two additional rigid members on either side of rigid members 405-1, 405-3 may all be positioned parallel to one another and perpendicular to rigid members 405-5, 405-4. With additional rigid members, additional cavities with rigid members on all four sides may be formed by the frame 404. As discussed further below, a cavity within the frame 404 may be configured to include an inventory engagement mechanism for the engagement, transport and delivery of item(s) and/or containers that contain item(s).

In some implementations, the aerial vehicle may be configured to reduce aerodynamic resistance. For example, an aerodynamic housing may be included on the aerial vehicle that encloses the aerial vehicle control system 410, one or more of the rigid members 405, the frame 404 and/or other components of the aerial vehicle 400. The housing may be made of any suitable material(s) such as graphite, carbon fiber, aluminum, titanium, magnesium, fiberglass, etc. Likewise, in some implementations, the location and/or the shape of the inventory (e.g., item or container) may be aerodynamically designed. For example, in some implementations, the inventory engagement mechanism 414 may be configured such that when the inventory is engaged it is enclosed within the frame and/or housing of the aerial vehicle 400 so that no additional drag is created during transport of the inventory by the aerial vehicle 400. In other implementations, the inventory may be shaped to reduce drag and provide a more aerodynamic design of the aerial vehicle and the inventory. For example, if the inventory is a container and a portion of the container extends below the aerial vehicle when engaged, the exposed portion of the container may have a curved shape.

The propellers 403 and corresponding propeller motors, or other form of propulsion, generally referred to herein as propulsion mechanisms, are positioned at both ends of each rigid member 405. The propeller motors may be any form of motor capable of generating enough speed with the propellers to lift the aerial vehicle 400 and any engaged inventory thereby enabling aerial transport of the inventory.

Extending outward from each rigid member is a support arm 406 that is connected to a safety barrier 408. In this example, the safety barrier is positioned around and attached to the aerial vehicle 400 in such a manner that the motors and propellers 403 are within the perimeter of the safety barrier 408. The safety barrier may be plastic, rubber, etc. Likewise, depending on the length of the support arms 406 and/or the length, number or positioning of the rigid members 405, the safety barrier may be round, oval, or any other shape.

Mounted to the frame 404 is the aerial vehicle control system 410. In this example, the aerial vehicle control system 410 is mounted in the middle and on top of the frame 404. The aerial vehicle control system 410 controls the operation, routing, navigation, communication and the inventory engagement mechanism of the aerial vehicle 400.

Likewise, the aerial vehicle 400 includes one or more power modules 412. In this example, the aerial vehicle 400 includes a power module 412 that are removably mounted to the frame 404 and configured to provide power to components of the aerial vehicle control system and/or other components of the aerial vehicle. In addition, the independent device boards 402-1, 402-2, and 402-3, which are part of the aerial vehicle control system 410 but illustrated herein for discussion purposes, may also each be coupled to independent power supplies 412-1, 412-2, and 412-3, respectively. By individually powering each device board, a power failure of one power supply will not affect the power provided to the other device boards 402. For example, if power supply 412-1 fails it will render device board 402-1 inoperable but will not impact the operation of device boards 402-2 or 402-3.

The power module(s) for the aerial vehicle may be in the form of battery power, solar power, gas power, super capacitor, fuel cell, alternative power generation source, or a combination thereof. For example, the power modules 412 may each be Lithium Polymer (lipo) batteries.

In some implementations, one or more of the power modules may be configured such that it can be autonomously removed and/or replaced with another power module while the aerial vehicle is landed (e.g., at power station 140-4).

As mentioned above, the aerial vehicle 400 also includes an inventory engagement mechanism 414. The inventory engagement mechanism may be configured to engage and disengage items and/or containers that hold items. In this example, the inventory engagement mechanism 414 is positioned within a cavity of the frame 404 that is formed by the intersections of the rigid members 405. In this example, the inventory engagement mechanism is positioned beneath the aerial vehicle control system 410. In implementations with additional rigid members, the aerial vehicle may include additional inventory engagement mechanisms and/or the inventory engagement mechanism 414 may be positioned in a different cavity within the frame 404. The inventory engagement mechanism may be of any size sufficient to securely engage and disengage containers that contain inventory. In other implementations, the engagement mechanism may operate as the container, containing the inventory item(s) to be delivered. The inventory engagement mechanism communicates with (via wired or wireless communication) and is controlled by the aerial vehicle control system 410.

While the implementations of the aerial vehicle discussed herein utilize propellers to achieve and maintain flight, in other implementations, the aerial vehicle may be configured in other manners. For example, the aerial vehicle may include fixed wings and/or a combination of both propellers and fixed wings. For example, the aerial vehicle may utilize one or more propellers to enable takeoff and landing and a fixed wing configuration or a combination wing and propeller configuration to sustain flight while the aerial vehicle is airborne.

Figure 5:
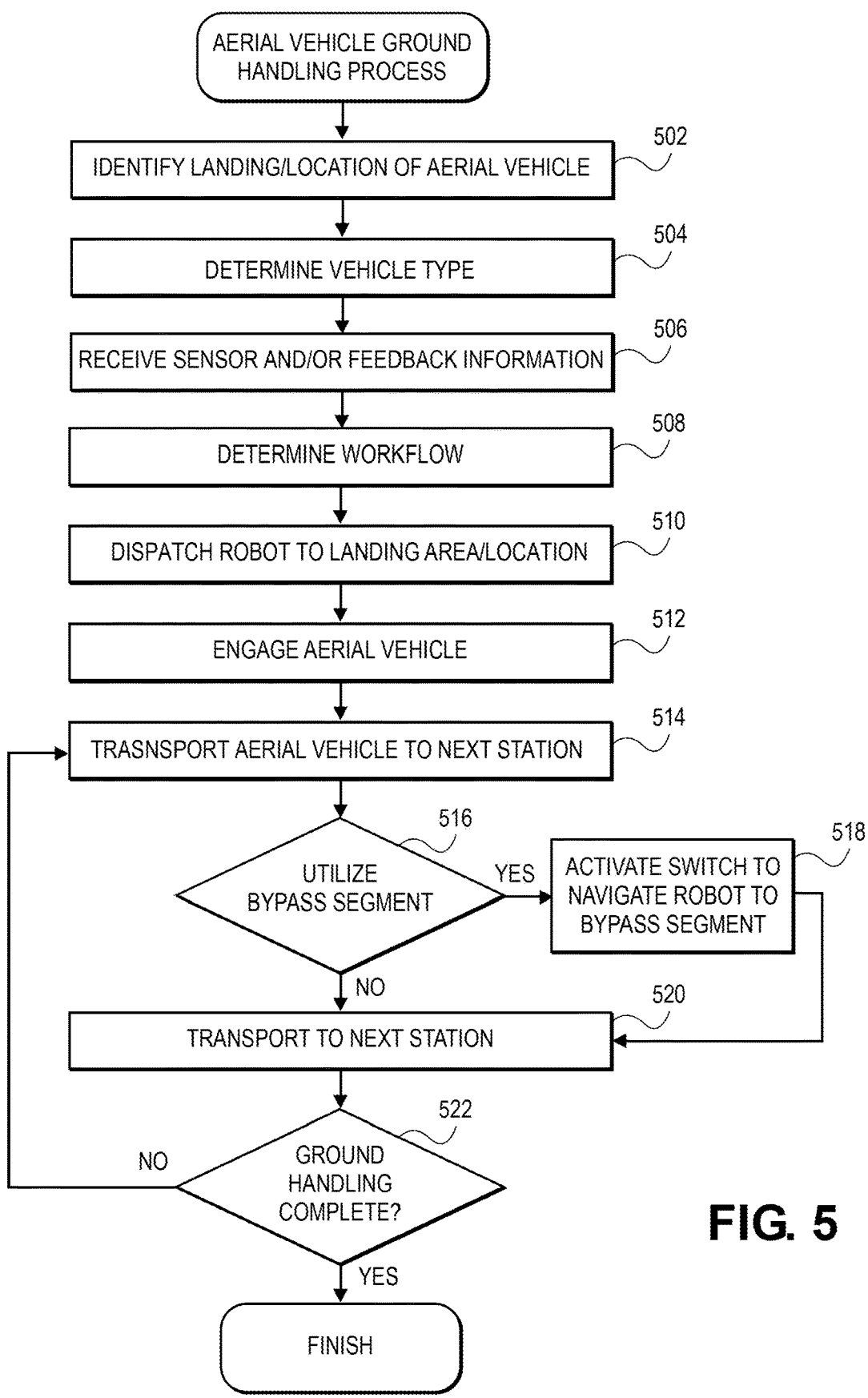
FIG. 5 is a flow diagram of an exemplary automated ground handling process for aerial vehicles, in accordance with embodiments of the present disclosure.

FIG. 5 is a flow diagram of an exemplary process 500 for automated ground handling of an aerial vehicle (e.g., aerial vehicle 160), according to embodiments of the present disclosure. Process 500 can be performed by, for example, automated aerial vehicle ground handling system 100. As shown in FIG. 5, in step 502, the landing and/or location of an aerial vehicle (e.g., aerial vehicle 160 at landing area 120) can be determined. The landing can be determined prior to landing (e.g., based on a scheduled landing, or as the aerial vehicle is making its approach to land) or after the aerial vehicle has landed. Additionally, a vehicle type of the aerial vehicle can be determined in step 504 and sensor information (e.g., from the aerial vehicle or from ground sensors) and/or feedback information (e.g., from the robots) can be received in step 506. In step 508, a workflow of the aerial vehicle can be determined based, at least in part, on the vehicle type, the sensor information, and/or feedback information obtained in steps 504 and 506. For example, if the aerial vehicle experienced a collision on its last mission, the workflow may begin with an inspection of the aerial vehicle (e.g., at inspection station 140-1). Alternatively, if the aerial vehicle experienced a failed delivery, the workflow may begin with an unloading of the existing payload and loading of a new payload (e.g., at payload station 140-5). In another scenario, if the aerial vehicle has a nearly depleted battery, the workflow may include recharging of the batteries (e.g., at power station 140-4), however, if the aerial vehicle still has sufficient power for a subsequent mission, the workflow may omit recharging of the batteries. According to other aspects, the workflow can be determined based on ground sensors that may detect an anomaly with the aerial vehicle and/or the operation of the automated ground handling system based on feedback information received from the robots. For example, imaging sensors on the ground can indicate a thermal runaway situation with an aerial vehicle and instruct a robot to attend to a potential firefighting situation. According to yet another example, feedback information received from the robots operating on the system can indicate a backlog associated with a certain ground handling station. In such a situation, subsequently arriving aerial vehicles can be assigned workflows to avoid the ground handling station causing delays and/or have the aerial vehicle visit the ground handling station causing delays later in its workflow.

In step 510, a robot can be dispatched (e.g., from robot queuing area 112) and can be navigated to the location where the aerial vehicle landed (e.g., landing area 120). Alternatively, in the event that an aerial vehicle undergoing the ground handling processing became disengaged from a robot, or an aerial vehicle is being removed from storage, etc., the robot can be dispatched and navigated to the location of the aerial vehicle. Once the robot arrives at the location of the aerial vehicle, the robot can engage the aerial vehicle (e.g., via grasping element 326), as in step 512. The robot can then transport the aerial vehicle to the next aerial vehicle handling station, as provided by the workflow, in step 514. Optionally, the robot can manipulate the aerial vehicle such that it is in a preferred pose for the aerial vehicle handling station. In step 516, it can be determined whether, based on the workflow, bypass segments can be utilized to skip certain aerial vehicle ground handling stations. If bypass segments can be utilized, switches are activated in step 518 to navigate the robot to the bypass segment. In step 520, the aerial vehicle is transported to the next aerial vehicle handling station for further ground handling. In step 522, it is determined whether ground handling processing of the aerial vehicle is complete. In the event that ground handling processing of the aerial vehicle is not complete, the robot transports the aerial vehicle to the next aerial vehicle handling station. Otherwise, if ground handling processing of the aerial vehicle is complete, process 500 terminates.

Figure 6:
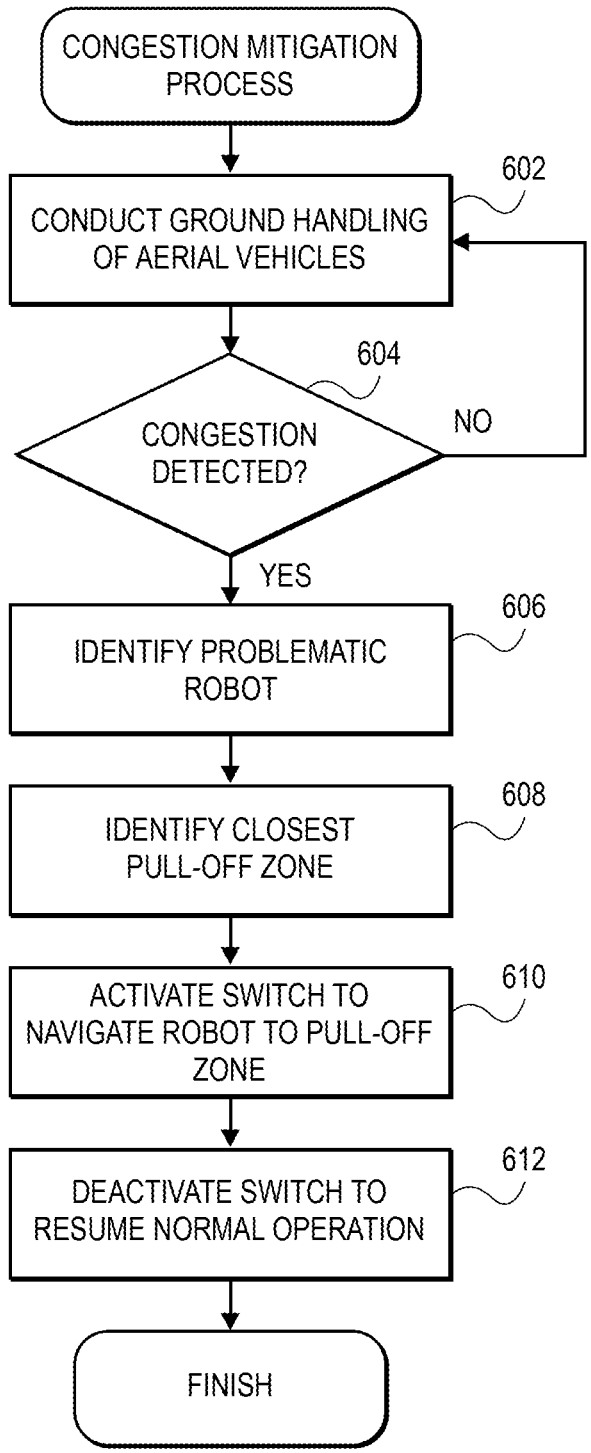
FIG. 6 is a flow diagram of an exemplary congestion mitigation process in the automated ground handling of aerial vehicles, in accordance with embodiments of the present disclosure.

FIG. 6 is a flow diagram of an exemplary process 600 for mitigating congestion in the automated ground handling of an aerial vehicle (e.g., aerial vehicle 160), according to embodiments of the present disclosure. As shown in FIG. 6, the automated ground handling of aerial vehicles is being performed (e.g., by automated aerial vehicle ground handling system 100), as in step 602. In step 604, it is determined if any congestion is detected (e.g., based on feedback obtained by the robots processing the ground handling of the aerial vehicles) in the processing of the automated ground handling of aerial vehicles. If no congestion is detected, the automated ground handling of aerial vehicles continues. In the event congestion is detected, the problematic robot that is the cause of the congestion is identified in step 606. After the problematic robot creating the congestion has been identified, the closest pull-off zone can be identified in step 608. In step 610, a switch is activated to be able to navigate the problematic robot to the identified pull-off zone. Next, in step 612, the switch is deactivated such that normal ground handling of aerial vehicles can proceed. Optionally, in situations where congestion is detected, workflows of the aerial vehicles being processed can be modified and workflows of incoming aerial vehicles can take the congestion into consideration to improve efficiency and throughput of the ground handling of aerial vehicles.

Figure 7:
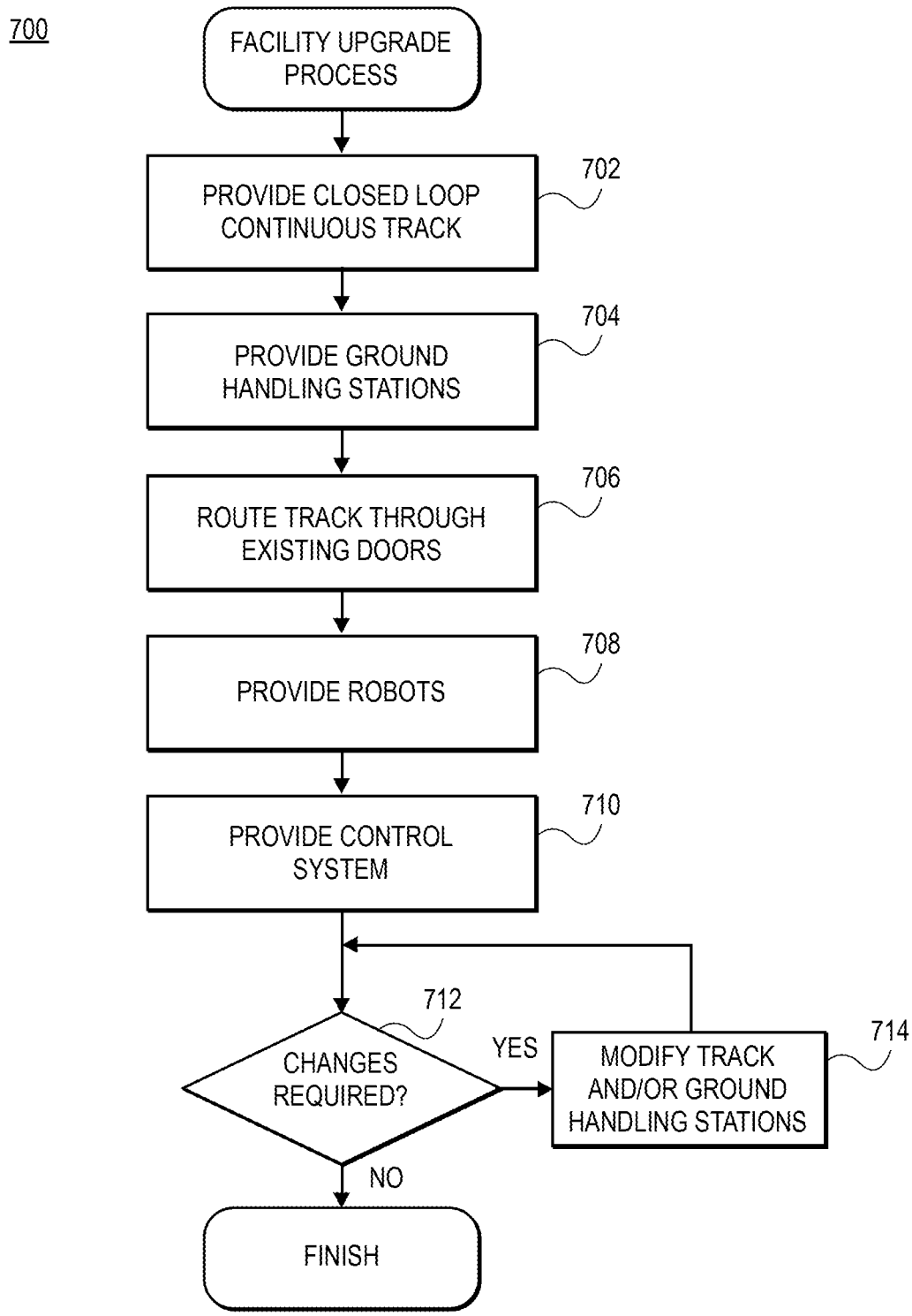
FIG. 7 is a flow diagram of an exemplary process for upgrading a facility with an automated ground handling system for aerial vehicles, in accordance with embodiments of the present disclosure.

FIG. 7 is a flow diagram of an exemplary process 700 for upgrading a facility with an automated ground handling system for an aerial vehicle (e.g., aerial vehicle 160), according to embodiments of the present disclosure. As shown in FIG. 7, a closed loop continuous track can be provided in step 702 and ground handling stations can be provided in step 704. The track can be routed through existing doors of the facility, as shown in step 706, to ensure that a portion of the track can be located outdoors adjacent to landing and takeoff areas and to reduce the alterations necessary to the existing facility. In steps 708 and 710, a plurality of robots to operate on the closed loop continuous track can be provided and a control system to control the automated ground handling system can be provided, respectively. In step 712, the automated ground handling system for an aerial vehicle can be continuously assessed if any changes are required. For example, certain changes may be required of the facility in which it is located. Alternatively, the automated ground handling system for an aerial vehicle may need to be changed to accommodate a new vehicle type. If changes are required, the track and the ground handling stations of the automated ground handling system for an aerial vehicle can be modular in design such that, in step 714, the continuous track can be lengthened, changed in shape, etc. and the position and location of the ground handling stations can be changed, added, removed, etc. along the continuous track to easily and efficiently accommodate the required changes.

Figure 8:
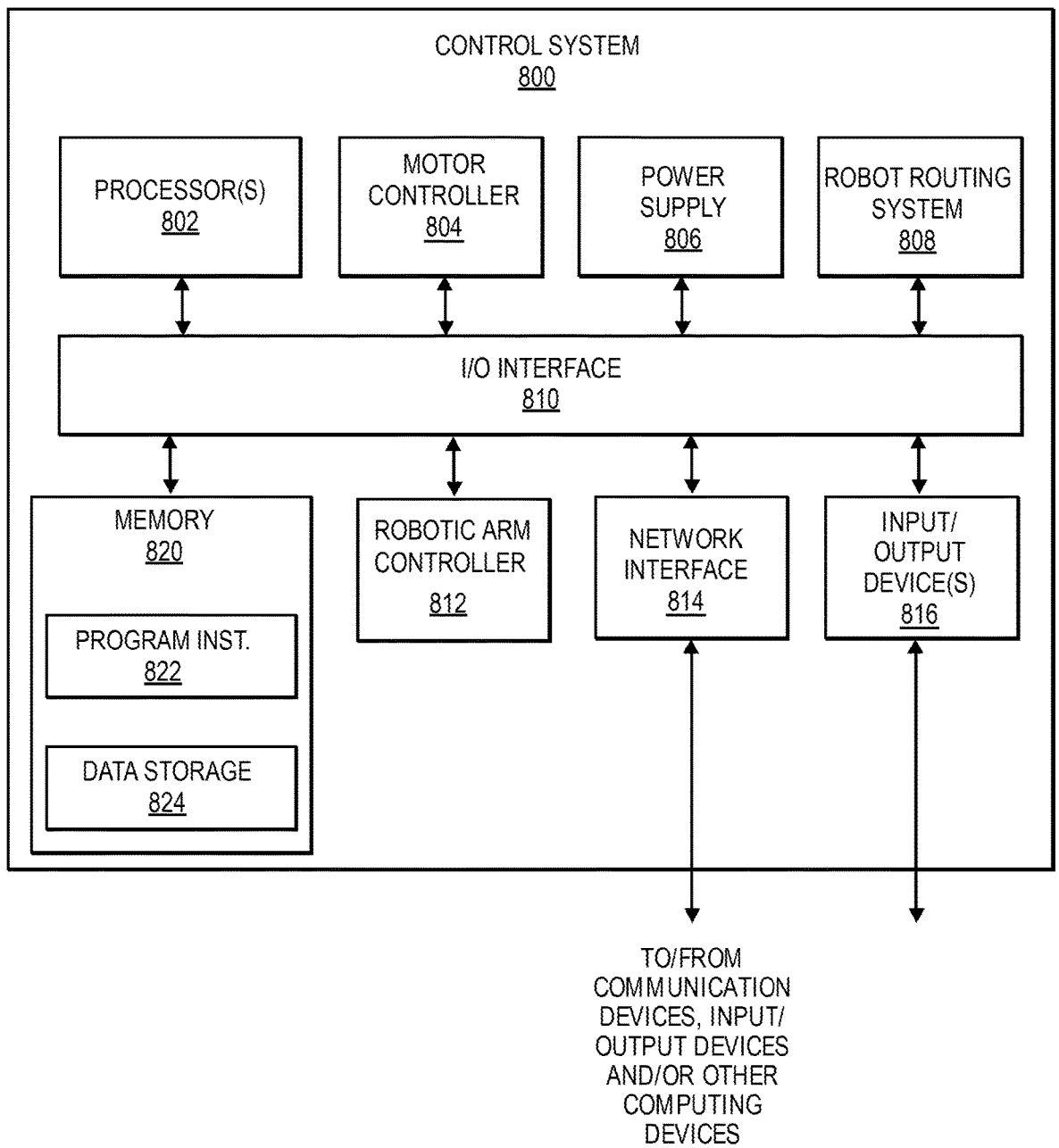
FIG. 8 is an exemplary automated aerial vehicle ground handling control system, in accordance with embodiments of the present disclosure.

FIG. 8 is a block diagram illustrating various components of an exemplary robot control system 800, in accordance with embodiments of the present disclosure.

In various examples, the block diagram may be illustrative of one or more aspects of the robot control system 800 that may be used to implement the various systems and methods discussed herein and/or to control operation of an aerial vehicle discussed herein. In the illustrated implementation, the robot control system 800 includes one or more processors 802, coupled to a memory, e.g., a non-transitory computer readable storage medium 820, via an input/output (I/O) interface 810. The robot control system 800 also includes motor controllers 804, such as electronic speed controls (ESCs) or motor controllers, power modules 806, robotic arm controller 812 and/or a robot routing system 808. The robot control system 800 further includes a network interface 814, and one or more input/output devices 816.

In various implementations, the robot control system 800 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, routing instructions, track layout information, aerial vehicle types, aerial vehicle workflows, and/or data items accessible by the processor(s) 802. In various implementations, the non-transitory computer readable storage medium 820 may be implemented using any suitable memory technology, such as static random-access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 820 as program instructions 822 and data storage 824, respectively. In other implementations, program instructions, data, and/or flight controls may be received, sent, or stored upon different types of computer-accessible media, such as non-transitory media, or on similar media separate from the non-transitory computer readable storage medium 820 or the robot control system 800. Generally speaking, a non-transitory, computer readable storage medium may include storage media or memory media such as magnetic or optical media, e.g., disk or CD/DVD-ROM, coupled to the robot control system 800 via the I/O interface 810. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 814.

In one embodiment, the I/O interface 810 may be configured to coordinate I/O traffic between the processor(s) 802, the non-transitory computer readable storage medium 820, and any peripheral devices, the network interface or other peripheral interfaces, such as input/output devices 816. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The motor controllers 804 may communicate with the robot routing system 808 and adjust the speed, position, orientation, or other parameters of each motor, to navigate the robot along the continuous track.

The robot routing system 808 may include sensors that can be used to navigate the robot along the continuous track. The robotic arm controller 812 communicates with the actuator(s) or motor(s) (e.g., a servo motor) used to manipulate, engage, and/or disengage aerial vehicles.

The network interface 816 may be configured to allow data to be exchanged between the robot control system 800, other devices attached to a network, such as other computer systems (e.g., remote computing resources), and/or with aerial vehicle control systems of other aerial vehicles. For example, the network interface 814 may enable wireless communication between the aerial vehicle and an aerial vehicle control system that is implemented on one or more remote computing resources. For wireless communication, an antenna of the aerial vehicle or other communication components may be utilized. As another example, the network interface 816 may enable wireless communication between numerous aerial vehicles. In various implementations, the network interface 814 may support communication via wireless general data networks, such as a Wi-Fi network. For example, the network interface 814 may support communication via telecommunications networks, such as cellular communication networks, satellite networks, and the like.

Input/output devices 816 may, in some implementations, include one or more displays, imaging sensors (e.g., cameras), speed sensors, force and torque detectors, laser sensors (e.g., LIDAR), thermal sensors, radar, thermal sensors, accelerometers, gyroscopes, RFID sensors, etc. Multiple input/output devices 816 may be present and controlled by the robot control system 800. One or more of these sensors may be utilized to implement the implementations described.

As shown in FIG. 8, the memory may include program instructions 822, which may be configured to implement the example routines and/or sub-routines described herein. The data storage 824 may include various data stores for maintaining data items that may be provided for robot navigation, determining routing of the robot, locating aerial vehicle locations, locating aerial vehicle handling locations, detecting objects or object types, determining track layout, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the robot control system 800 is merely illustrative and is not intended to limit the scope of the present disclosure. In particular, the computing system and devices may include any combination of hardware or software that can perform the indicated functions. The robot control system 800 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated robot control system 800. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the robot control system 800 may be transmitted to the robot control system 800 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

Figure 9:
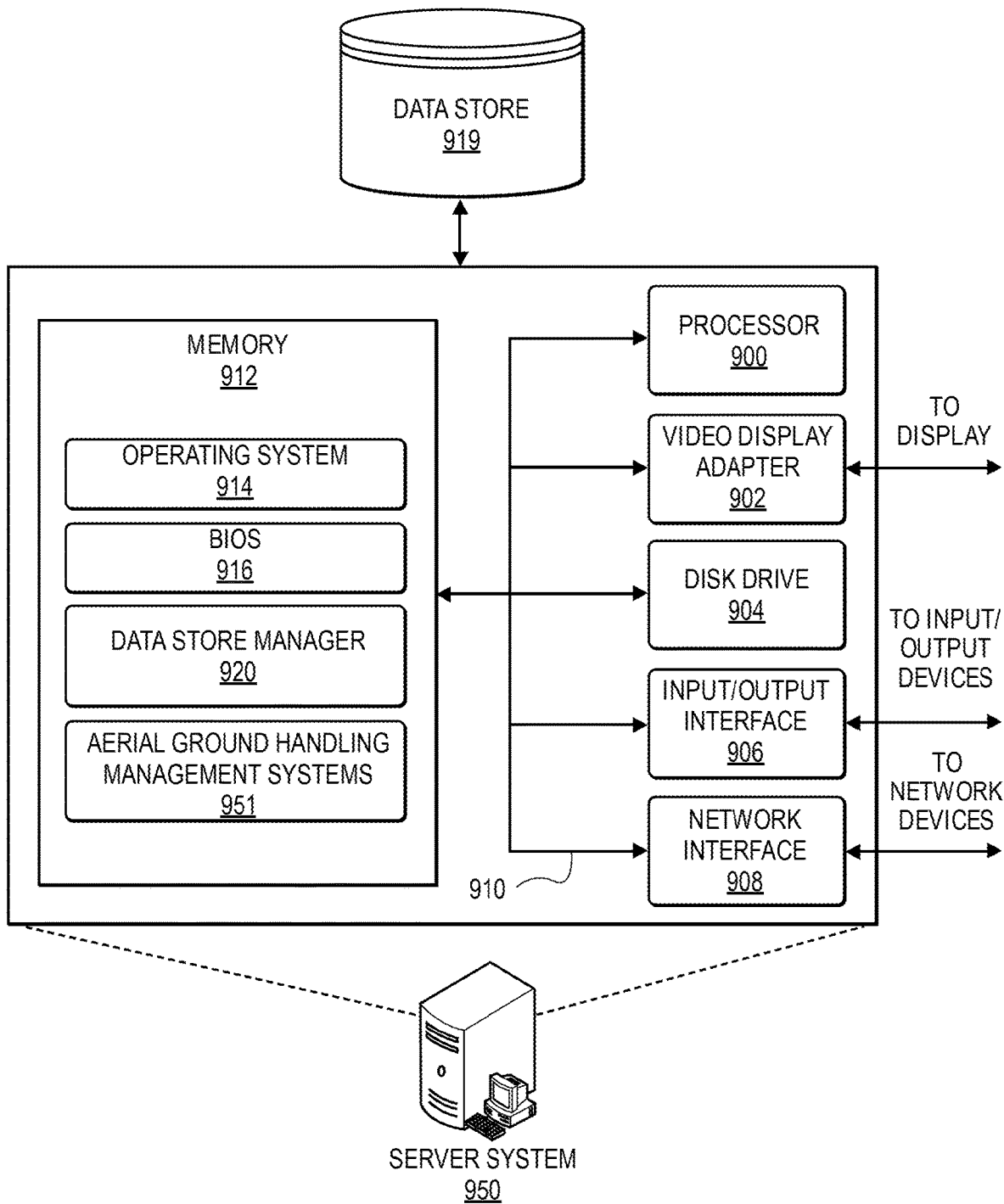
FIG. 9 is an exemplary computing system, in accordance with embodiments of the present disclosure.

FIG. 9 is a pictorial diagram of an illustrative implementation of a server system 950 that may be used in the implementations described herein.

The server system 950 may include a processor 900, such as one or more redundant processors, a video display adapter 902, a disk drive 904, an input/output interface 906, a network interface 908, and a memory 912. The processor 900, the video display adapter 902, the disk drive 904, the input/output interface 906, the network interface 908, and the memory 912 may be communicatively coupled to each other by a communication bus 910.

The video display adapter 902 provides display signals to a local display permitting an operator of the server system 950 to monitor and configure operation of the server system 950. The input/output interface 906 likewise communicates with external input/output devices, such as a mouse, keyboard, scanner, or other input and output devices that can be operated by an operator of the server system 950. The network interface 908 includes hardware, software, or any combination thereof, to communicate with other computing devices. For example, the network interface 908 may be configured to provide communications between the server system 950 and other computing devices, such as the robot control system 800 of a robot 110.

The memory 912 may be a non-transitory computer readable storage medium configured to store executable instructions accessible by the processor(s) 900. In various implementations, the non-transitory computer readable storage medium may be implemented using any suitable memory technology, such as static random access memory (SRAM), synchronous dynamic RAM (SDRAM), nonvolatile/Flash-type memory, or any other type of volatile or permanent memory. In the illustrated implementation, program instructions and data implementing desired functions, such as those described herein, are shown stored within the non-transitory computer readable storage medium. In other implementations, program instructions may be received, sent, or stored upon different types of computer-accessible media, such as non-transitory media, or on similar media separate from the non-transitory computer readable storage medium. Generally speaking, a non-transitory, computer readable storage medium may include storage media or memory media such as magnetic or optical media, e.g., disk or CD/DVD-ROM. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 908.

The memory 912 is shown storing an operating system 914 for controlling the operation of the server system 950. A binary input/output system (BIOS) 916 for controlling the low-level operation of the server system 950 is also stored in the memory 912. The memory 912 additionally stores computer executable instructions, that, when executed by the processor 900 cause the processor to perform one or more of the processes discussed herein. The memory 912 additionally stores program code and data for providing network services. The data store manager application 920 facilitates data exchange between the data store 919 and/or other data stores.

As used herein, the term "data store" refers to any device or combination of devices capable of storing, accessing and retrieving data which may include any combination and number of data servers, databases, data storage devices and data storage media in any standard, distributed or clustered environment. The server system 950 can include any appropriate hardware and software for integrating with the data stores 917, 919 as needed to execute aspects of the management systems 950.

The data stores 917, 919 can include several separate data tables, databases or other data storage mechanisms and media for storing data relating to a particular aspect. For example, the data stores 917, 919 illustrated include mechanisms for maintaining robot routing, aerial vehicle type, aerial vehicle workflow, track layout, etc. Depending on the configuration and use of the server system 950, one or more of the data stores may not be included or accessible to the server system 950 and/or other data store may be included or accessible.

It should be understood that there can be many other aspects that may be stored in the data stores 917, 919. The data stores 917, 919 are operable, through logic associated therewith, to receive instructions from the server system 950 and obtain, update or otherwise process data in response thereto.

The memory 912 may also include an aerial item delivery management system 951. The item delivery management system 951 may be configured to perform some or all of the implementations discussed herein and/or to exchange data and information with one or more aerial vehicles. For example, the item delivery management system 951 may perform one or more of the processes discussed above with respect to FIGS. 5 and 6.

The corresponding server system 950 may be executable by the processor 900 to implement one or more of the functions of the server system 950. In one implementation, the server system 950 may represent instructions embodied in one or more software programs stored in the memory 912. In another implementation, the system 950 can represent hardware, software instructions, or a combination thereof.

The server system 950, in one implementation, is a distributed environment utilizing several computer systems and components that are interconnected via communication links, using one or more computer networks or direct connections. It will be appreciated by those of ordinary skill in the art that such a system could operate equally well in a system having fewer or a greater number of components than are illustrated in FIG. 9. Thus, the depiction in FIG. 9 should be taken as being illustrative in nature and not limiting to the scope of the disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 5-7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desire.

What is claimed is:

1. A system for automated handling of an aerial vehicle, comprising:
    at least one continuous robotic track, the at least one continuous robotic track forming a closed loop;
    a plurality of aerial vehicle handling stations disposed along the at least one continuous robotic track, the at least one continuous robotic track being configured to link the plurality of aerial vehicle handling stations;
    a plurality of robots operating on the at least one continuous robotic track; and
    a control system including one or more processors and program instructions that, when executed by the one or more processors, cause the one or more processors to at least:
        determine a workflow associated with the aerial vehicle based on at least one of an aerial vehicle type of the aerial vehicle or sensor information;
        determine a location of the aerial vehicle, the location being one aerial vehicle handling station from the plurality of aerial vehicle handling stations;
        direct a first robot from the plurality of robots to navigate, via the at least one continuous robotic track, to the location;
        direct the first robot to engage the aerial vehicle at the location;
        determine, based at least in part on the workflow, a next aerial vehicle handling station from the plurality of aerial vehicle handling stations to which the aerial vehicle is to be transported; and
        direct the first robot to transport the aerial vehicle, via the at least one continuous robotic track, to the next aerial vehicle handling station.

2. The system of claim 1, wherein the plurality of aerial vehicle handling stations includes at least one of:
    a landing area;
    a takeoff area;
    a maintenance station;
    an inspection station;
    a storage station;
    a payload station;
    a robot queuing station;
    a ground station equipment; or
    a power station.

3. The system of claim 1, wherein at least one of the plurality of robots includes:
    a robotic arm having a plurality of pivots to provide multiple degrees of freedom;
    and
    a carriage portion configured to engage the at least one continuous track to allow each of the plurality of robots to operate on the at least one continuous track.

4. The system of claim 3, wherein the robotic arm includes a grasping element configured to engage the aerial vehicle and wherein the robotic arm is configured to orient the aerial vehicle in a plurality of poses.

5. The system of claim 1, wherein the at least one continuous robotic track includes:
    a plurality of pull-off zones;
    a plurality of bypass robotic track segments; and
    a switch network to control navigation of the plurality of robots to and from the plurality of pull-off zones and the plurality of bypass robotic track segments.

6. The system of claim 5, wherein the program instructions include further instructions that, when executed by the one or more processors, cause the one or more processors to at least:
    determine that the first robot is creating a congestion point on the at least one continuous robot track;
    activate the switch network to direct the first robot into a first pull-off zone from the plurality of pull-off zones; and
    direct a second robot to pass the first robot.

7. The system of claim 5, wherein the program instructions include further instructions that, when executed by the one or more processors, cause the one or more processors to at least:
- determine, based at least in part on the workflow, that the aerial vehicle is to bypass at least one aerial vehicle handling station from the plurality of aerial vehicle handling stations;
- activate the switch network to direct the first robot onto a first bypass robotic track segment from the plurality of bypass robotic track segments that is configured to avoid the at least one aerial vehicle handling station; and
- route the first robot, via the first bypass robotic track, to circumvent the at least one aerial vehicle handling station.

8. The system of claim 1, further comprising:
- at least one sensor, and wherein the sensor information includes at least one of aerial vehicle sensor information received from the aerial vehicle or system sensor information received from the at least one sensor.

9. The system of claim 1, wherein the program instructions include further instructions that, when executed by the one or more processors, cause the one or more processors to at least further determine the workflow based at least in part on feedback information received from the plurality of robots.

10. The system of claim 1, wherein the program instructions include further instructions that, when executed by the one or more processors, cause the one or more processors to at least:
- direct the first robot to disengage the aerial vehicle at the next aerial vehicle handling station;
- direct a second robot from the plurality of robots to navigate, via the at least one continuous robotic track, to the next aerial vehicle handling station;
- direct the second robot to engage the aerial vehicle at the next aerial vehicle handling station;
- determine, based at least in part on the workflow, a third aerial vehicle handling station from the plurality of aerial vehicle handling stations to which the aerial vehicle is to be transported; and
- direct the second robot to transport the aerial vehicle, via the at least one continuous robotic track, to the third aerial vehicle handling station.

11. The system of claim 1, further comprising a robot queuing area for inactive robots.

12. The system of claim 1, wherein the at least one continuous robotic track includes a first track and a second track, the first track and the second track being arranged side-by-side in a parallel configuration.

* * * * *